United States Patent [19]

Eilingsfeld et al.

[11] 4,340,537
[45] Jul. 20, 1982

[54] MONOAZO DYES OF THE THIAZOLE SERIES HAVING A HETEROCYCLIC SUBSTITUENT IN THE 4-POSITION

[75] Inventors: Heinz Eilingsfeld, Frankenthal; Guenter Hansen; Guenther Seybold, both of Ludwigshafen, all of Fed. Rep. of Germany

[73] Assignee: BASF Aktiengesellschaft, Ludwigshafen, Fed. Rep. of Germany

[21] Appl. No.: 124,740

[22] Filed: Feb. 26, 1980

[30] Foreign Application Priority Data

Mar. 20, 1979 [DE] Fed. Rep. of Germany ....... 2910806

[51] Int. Cl.³ .................... C07C 107/04; C09B 29/36
[52] U.S. Cl. ................................. 260/158; 260/155; 260/156; 546/165; 546/176; 546/209; 548/193; 546/280; 548/190
[58] Field of Search ................... 260/158, 155, 156

[56] References Cited

U.S. PATENT DOCUMENTS

| | | | |
|---|---|---|---|
| 3,770,719 | 11/1973 | Fisher et al. | 260/158 |
| 3,816,391 | 6/1974 | Coates et al. | 260/158 |
| 4,250,090 | 2/1981 | Eilingsfeld et al. | 260/158 |

FOREIGN PATENT DOCUMENTS

| | | | |
|---|---|---|---|
| 2816629 | 10/1978 | Fed. Rep. of Germany | 260/158 |
| 2735751 | 3/1979 | Fed. Rep. of Germany | 260/158 |
| 2738885 | 3/1979 | Fed. Rep. of Germany | 260/158 |
| 2746444 | 4/1979 | Fed. Rep. of Germany | 260/158 |
| 2405978 | 5/1979 | France | 260/158 |
| 2003170 | 3/1979 | United Kingdom | 260/158 |
| 2004561 | 4/1979 | United Kingdom | 260/158 |
| 2006804 | 5/1979 | United Kingdom | 260/158 |
| 2022121 | 12/1979 | United Kingdom | 260/158 |

*Primary Examiner*—Charles F. Warren
*Attorney, Agent, or Firm*—Oblon, Fisher, Spivak, McClelland & Maier

[57] ABSTRACT

Dyes of the thiazole series, having the general formula I

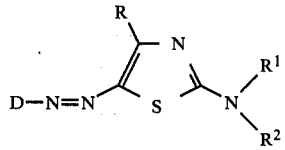

where
D is the radical of an aromatic diazo component,
R is a heterocyclic radical and
$R^1$ and $R^2$ are hydrogen or unsubstituted or substituted hydrocarbon radicals, which may also together form a ring, which may or may not be heterocyclic.

The dyes according to the invention are particularly suitable for dyeing synthetic polyesters.

3 Claims, No Drawings

MONOAZO DYES OF THE THIAZOLE SERIES HAVING A HETEROCYCLIC SUBSTITUENT IN THE 4-POSITION

The present invention relates to dyes of the general formula I

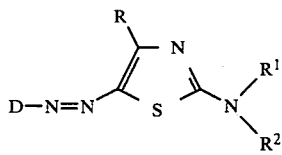

where
D is the radical of an aromatic diazo component,
R is a heterocyclic radical and
$R^1$ and $R^2$ are hydrogen or unsubstituted or substituted hydrocarbon radicals, which may also together form a ring, which may or may not be heterocyclic.

D represents the aromatic radical that remain after the reaction of a diazo compound of formula D—N≡N, formed from an aromatic amine of formula D—NH$_2$, with a substituted thiazole.

Examples of substituents of the radicals D are fluorine, chlorine, bromine, $C_1$-$C_8$-alkyl, unsubstituted and substituted phenyl, $C_1$-$C_8$-alkoxy, unsubstituted and substituted phenoxy, $C_1$-$C_4$-alkylsulfonyl, unsubstituted and substituted phenylsulfonyl, unsubstituted and substituted alkoxycarbonyl, aroxycarbonyl, aminocarbonyl and aminosulfonyl, cyano, nitro and trifluoromethyl.

Specific examples of substituents, in addition to those already mentioned, are: methyl, ethyl, n- and i-propyl, n- and i-butyl, amyl, hexyl, octyl, phenyl, p-chlorophenyl, methoxy, ethoxy, butoxy, 2-ethylhexoxy, phenoxy, 4-methyl-phenoxy, 4-methoxy-phenoxy, methylsulfonyl, ethylsulfonyl, phenylsulfonyl, 2-chloro-phenylsulfonyl, methoxycarbonyl, ethoxycarbonyl, hexoxycarbonyl, 2-ethylhexoxycarbonyl, methoxyethoxycarbonyl, phenoxycarbonyl, 4-chlorophenoxycarbonyl, 4-methoxyphenoxycarbonyl, methylaminocarbonyl, ethylaminocarbonyl, butylaminocarbonyl and phenylaminocarbonyl.

Specific examples of preferred diazo components are: 2-chloro-4-nitroaniline, 2-bromo-4-nitro-6-cyanoaniline, 2-cyano-4-nitroaniline, 2-methylsulfonyl-4-nitroaniline, 2,4-dinitro-6-bromoaniline, 2,4-dinitro-6-chloroaniline, 2,6-dichloro-4-nitroaniline, 2,6-dibromo-4-nitroaniline, 2-cyano-6-chloro-4-nitroaniline, 2-cyano-6-bromo-4-nitroaniline, 2,6-dicyano-4-nitroaniline, 2,4-dinitro-6-methoxycarbonyl-4-nitroaniline, 2,4-dinitro-6-methylsulfonyl-4-nitroaniline, 2,4-dinitro-6-cyanoaniline, 4-nitro-1-aminonaphthalene and 1-aminoanthraquinone.

Amongst these, the following are particularly preferred, for technical reasons: 2,4-dinitro-6-cyanoaniline, 2-bromo-4-nitro-6-cyano-aniline, 2,4-dinitro-6-bromoaniline, 2,4-dinitro-6-chloro-aniline and 2,6-dicyano-4-nitroaniline.

Heterocyclic radicals R are derived from, for example, the furan, thiophene, thiazole, pyrrole, indole, dioxolane, thiophthene, pyridine or quinoline series, and may be substituted by, for example, F, Cl, Br, unsubstituted or substituted $C_1$-$C_8$-alkyl, $C_3$-$C_5$-alkenyl or $C_7$-$C_{10}$-aralkyl, unsubstituted or substituted phenyl, $C_1$-$C_8$-alkoxy, $C_1$-$C_8$-alkylmercapto, nitro, cyano, $C_1$-$C_8$-alkoxycarbonyl, $C_1$-$C_8$-alkylsulfonyl, dialkylamino or acylamino.

Specific examples of radicals R are:

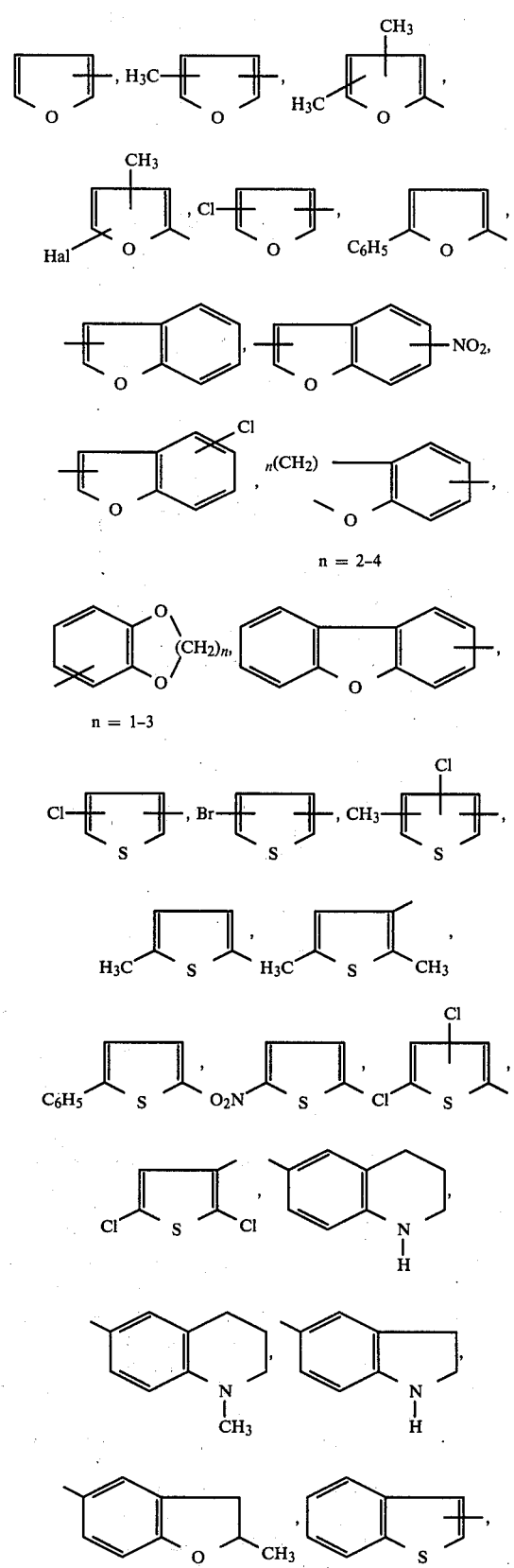

-continued

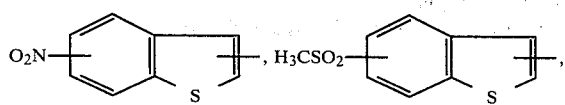
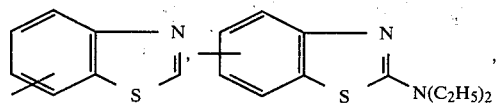
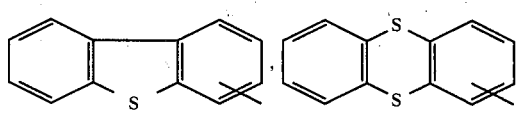
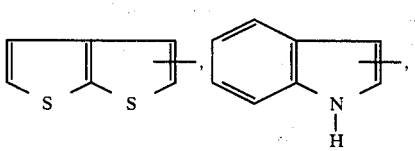
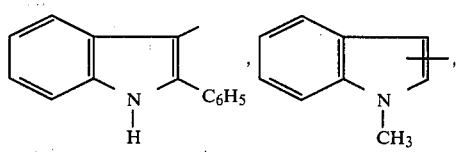
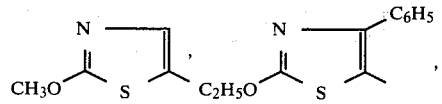
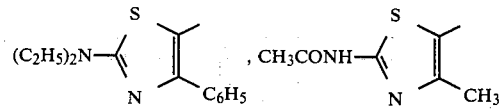
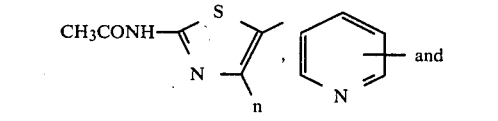
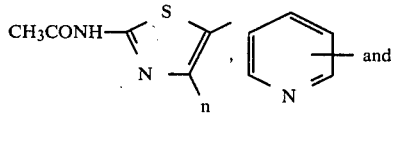
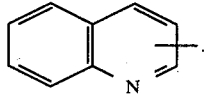

Examples of radicals $R^1$ and $R^2$, in addition to hydrogen, are unsubstituted and substituted alkyl, alkenyl, alkynyl, cycloalkyl, aralkyl and aryl radicals, of mainly up to 8 carbon atoms, and which may contain the substituents conventionally found in azo dyes.

In particular, radicals $R^1$ and $R^2$ are $C_1$-$C_8$-alkyl, alkyl which is substituted by cyano, hydroxyl, alkoxy of 1 to 8 carbon atoms, phenoxy, phenoxyethoxy or benzyloxy, allyl, cyclohexyl, benzyl, phenylethyl, phenylhydroxyethyl, phenylpropyl, phenylbutyl, phenyl which is unsubstituted or substituted by chlorine, methyl, methoxy or ethoxy, as well as polyalkoxyalkyl, hydroxypolyalkoxyalkyl, alkanoyloxyalkyl or alkoxycarbonylalkyl of the type mentioned below.

Specific examples of radicals $R^1$ and $R^2$ are the alkyl radicals methyl, ethyl, propyl and butyl, the hydroxyalkyl radicals β-hydroxyethyl, β-hydroxypropyl, γ-hydroxypropyl and ω-hydroxyhexyl, β-$C_1$-$C_4$-alkoxycarbonylethyl and the radicals of the formulae

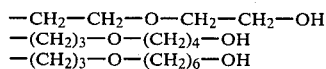
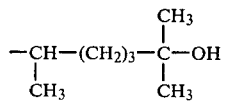
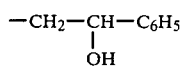

$CH_2CH_2CN$
$CH_2CH=CH_2$
$CH_2CH_2OCONH(C_1$-$C_4$—alkyl)

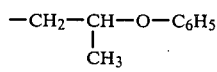
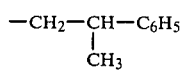

and the acyloxyalkyl radicals of the formulae

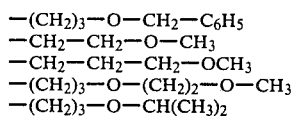
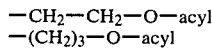
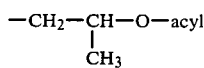
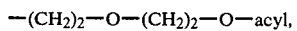

where acyl may be, for example, —COH, —$COCH_3$ or —$COCH_2$—O—$C_6H_5$. Other acyl radicals are COOB and CONHB, where B is methyl or phenyl.

A compound of the formula I may be prepared by reacting a diazo compound formed from an amine of the formula $D$—$NH_2$ with a coupling component of the formula II

Details of the method of preparation may be found in the Examples, where parts and percentages are by weight, unless stated otherwise.

The coupling components of the formula II may be prepared by processes similar to that described in German Laid-Open Application DOS No. 1,812,982.

The compounds of the formula I are yellow to green and are particularly suitable for use as disperse dyes for synthetic and cellulosic fibers, for example cellulose esters, nylons and especially polyesters. The dyeings obtained have good fastness characteristics, in particular good lightfastness, fastness to thermofixing and wet-fastness.

Some of the dyes of the formula I are also suitable for the process described in German Pat. No. 1,811,796.

Dyes of particular importance are those of the formula I a

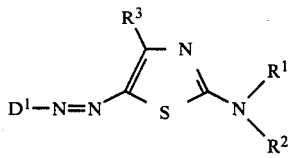
(Ia)

where
D¹ is unsubstituted or substituted phenyl and R³ is a radical of the formula

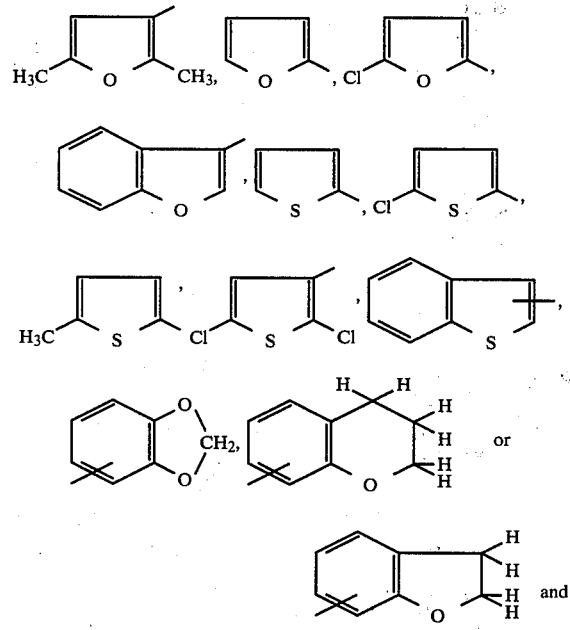

R¹ and R² have the stated meanings.

Examples of preferred radicals D are 4-nitrophenyl, 2,4-dinitrophenyl, 2-cyano-4-nitrophenyl, 2-chloro-4,6-dinitrophenyl, 2-bromo-4,6-dinitrophenyl, 2-cyano-4,6-dinitrophenyl, 2-cyano-6-bromo-4-nitrophenyl, 2-cyano-6-chloro-4-nitrophenyl, 2-methoxycarbonyl-4,6-dinitrophenyl, 2,4-dicyano-phenyl and 2-methylsulfonyl-4-nitrophenyl.

Particularly preferred meanings of R³ are

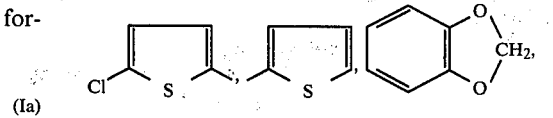

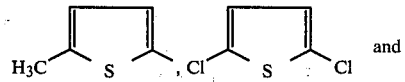

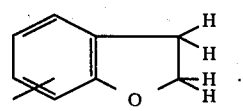

Examples of particularly preferred radicals R¹ and R² are hydrogen, methyl, ethyl, propyl, butyl, allyl, benzyl, cyclohexyl, β-ethoxycarbonylethyl, β-cyanoethyl, β-hydroxyethyl, β-acetoxyethyl and phenyl, whilst in the case of a radical

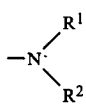

preferred meanings are morpholino, pyrrolidino or piperidino.

EXAMPLE 1

7 parts of sodium nitrite in 50 parts of water are added to an ice-cold suspension of 13.8 parts of 4-nitroaniline in a mixture of 350 parts of water and 30 parts of concentrated hydrochloric acid. After the mixture has been stirred for two hours, the excess nitrite is removed by adding urea. A solution of 28.0 parts of 2-diethylamino-4-furan-2-yl-thiazole in 100 parts of glacial acetic acid is prepared and the diazonium solution is added thereto, whilst cooling, whereupon the dye forms. The coupling is complete after the mixture has been stirred overnight. After filtration, washing neutral and drying, 31 parts of a dark-colored powder are obtained. This dyes polyester fibers in bluish red hues.

The dyes characterized by the diazo component and coupling component in the Table which follows are also obtained by a method similar to Example 1.

| Example | Diazo component | Coupling component | Hue on polyester |
|---|---|---|---|
| 2 | NC—⌬—NH₂ | (furan-thiazole with N(C₂H₅)₂) | red |

| Example | Diazo component | Coupling component | Hue on polyester |
|---|---|---|---|
| 3 | 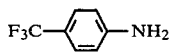 | 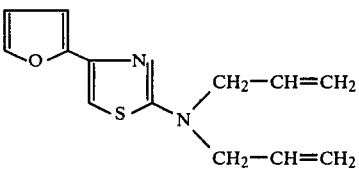 | yellowish red |
| 4 | 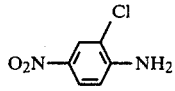 | 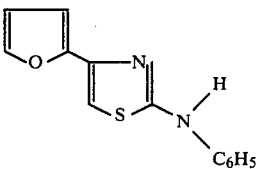 | reddish violet |
| 5 | 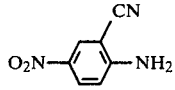 | 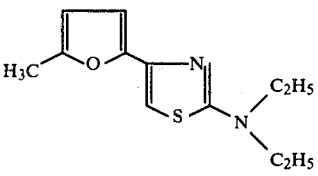 | violet |
| 6 | 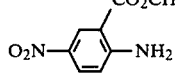 | 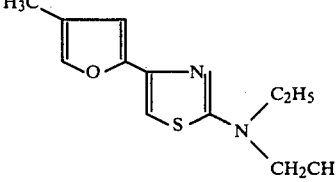 | violet |
| 7 | 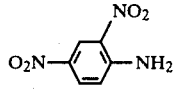 | 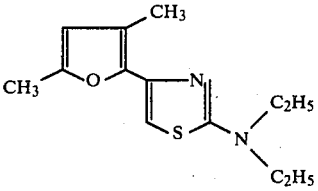 | bluish violet |
| 8 | 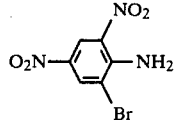 | 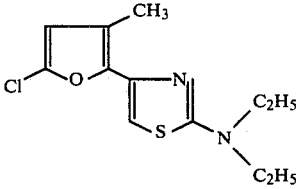 | navy |
| 9 | 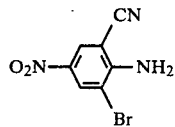 | 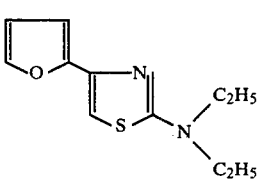 | blue |
| 10 | 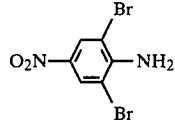 | 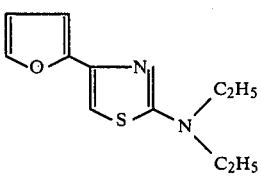 | violet |

-continued
| Example | Diazo component | Coupling component | Hue on polyester |
|---|---|---|---|
| 11 |  | 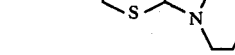 | navy |
| 12 |  |  | green |
| 13 |  | 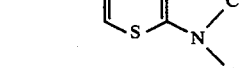 | blue |
| 14 |  |  | yellowish red |
| 15 | 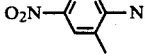 |  | violet |
| 16 |  |  | bluish red |
| 17 | 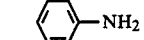 |  | red |
| 18 | 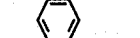 | 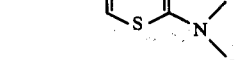 | red |

-continued

| Example | Diazo component | Coupling component | Hue on polyester |
|---|---|---|---|
| 19 | CH₃O—⟨⟩—NH₂ | benzofuran-thiazole-N(C₂H₅)₂ | reddish orange |
| 20 | O₂N—⟨⟩(COOCH₃)—NH₂ | propoxy-methoxyphenyl-thiazole-N(C₂H₅)₂ | bluish red |
| 21 | H₁₇C₈—⟨⟩—NH₂ | dihydrobenzofuran-thiazole-N(C₂H₅)₂ | orange |
| 22 | O₂N—naphthyl—NH₂ | dihydrobenzofuran-thiazole-N(CH₂—CH=CH₂)₂ | violet |

EXAMPLE 23

10.4 parts of 2,4-dinitro-6-cyanoaniline are introduced into 70 parts of 85% strength sulfuric acid at 10°–15° C. 14.8 parts of a nitrosylsulfuric acid containing 12.8% of N₂O₃ are added at 0°–5° C. After stirring for 3–4 hours at 0°–5° C., the excess nitrite is removed with amidosulfonic acid and the diazonium solution is combined with a solution comprising 11.9 parts of 2-diethylamino-4-thien-2-yl-thiazole in 50 parts of dimethylformamide, 5 parts of a condensate of 23 moles of ethylene oxide with a partially unsaturated fatty alcohol mixture, and 300 parts of ice. After stirring for several hours, the dye is filtered off, washed neutral with water and dried under reduced pressure at 50° C. 22 parts of a dark powder, which dyes polyester in fast green hues, are obtained.

| Example | Diazo component | Coupling component | Hue on polyester |
|---|---|---|---|
| 24 | NC—⟨⟩(CN)—NH₂ | thienyl-thiazole-N(C₂H₅)₂ | reddish violet |
| 25 | O₂N—⟨⟩—NH₂ | thienyl-thiazole-N(CH₂—CH=CH₂)₂ | bluish red |
| 26 | O₂N—⟨⟩(CN)(Br)—NH₂ | H₃C-thienyl-thiazole-N(C₂H₄CN)(C₂H₅) | blue |

-continued

| Example | Diazo component | Coupling component | Hue on polyester |
|---|---|---|---|
| 27 | 2-amino-3,5-dinitro-1-methylsulfonylbenzene (NO₂, NH₂, O₂N, SO₂CH₃) | 4-(2-thienyl)-2-[N-ethyl-N-(2-acetoxyethyl)amino]thiazole (C₂H₄OCOCH₃, C₂H₅) | green |
| 28 | 2-amino-3,5-dinitro-1-bromobenzene (NO₂, NH₂, O₂N, Br) | 4-(2-thienyl)-2-[N-ethyl-N-(2-(N-methylcarbamoyloxy)ethyl)amino]thiazole (C₂H₄OC(O)NHCH₃, C₂H₅) | blue |
| 29 | 4-aminobenzonitrile (NC—NH₂) | 4-(5-chloro-2-thienyl)-2-(phenylamino)thiazole (Cl, C₆H₅, H) | red |
| 30 | 2-amino-5-nitrobenzonitrile (CN, O₂N, NH₂) | 4-(2-thienyl)-2-(n-butylamino)thiazole (C₄H₉, H) | violet |
| 31 | 2-amino-5-nitro-1-(isopropoxycarbonyl)benzene (CO₂C₃H₇, O₂N, NH₂) | 4-(2-thienyl)-2-[N-ethyl-N-(2-methoxyethyl)amino]thiazole (C₂H₄OCH₃, C₂H₅) | reddish violet |
| 32 | 2-amino-3-bromo-5-nitro-1-(methoxycarbonyl)benzene (CO₂CH₃, O₂N, NH₂, Br) | 4-(2-thienyl)-2-[N-butyl-N-(2-cyanoethyl)amino]thiazole (C₄H₉, C₂H₄CN) | bluish violet |
| 33 | 2-amino-3,5-dinitrobenzonitrile (NO₂, NH₂, O₂N, CN) | 5-(2-thienyl)-2-[N-ethyl-N-(2-methoxycarbonylethyl)amino]thiazole (C₂H₅, C₂H₄CO₂CH₃) | green |
| 34 | 2-amino-3,5-dinitrobenzonitrile (NO₂, NH₂, O₂N, CN) | 4-(3,4-methylenedioxyphenyl)-2-(N,N-diethylamino)thiazole (H₂C⟨O,O⟩, C₂H₅, C₂H₅) | green |

| Example | Diazo component | Coupling component | Hue on polyester |
|---|---|---|---|
| 35 | 2-NH2, 3-NO2, 5-NO2, 1-CN benzene | 4-(3,4-methylenedioxyphenyl)-2-[N-(C2H4OCH3)(C2H5)amino]thiazole | green |
| 36 | 2-NH2, 3-CN, 5-NO2, 6-Br benzene | 4-(3,4-methylenedioxyphenyl)-2-[N-(C2H4CO2C4H9)(C2H5)amino]thiazole | blue |
| 37 | 2-NH2, 3-NO2, 5-NO2, 6-SO2CH3 benzene | 4-(3,4-methylenedioxyphenyl)-2-[N-(C2H4CN)(C2H5)amino]thiazole | green |
| 38 | 2-NH2, 3-NO2, 5-NO2, 6-CN benzene | 4-(benzo[b]thiophen-2-yl)-2-[N-(C2H4OCONHC3H7)(C2H5)amino]thiazole | green |
| 39 | 2-NH2, 3-CN, 5-NO2, 6-Br benzene | 4-(benzo[b]thiophen-2-yl)-2-[N,N-di(CH2—CH=CH2)amino]thiazole | blue |
| 40 | 2-NH2, 3-NO2, 5-NO2, 6-Br benzene | 4-(benzo[b]thiophen-2-yl)-2-[N,N-di(C2H5)amino]thiazole | navy |
| 41 | 2-NH2, 3-CN, 5-NO2 benzene | 4-(benzofuran-3-yl)-2-[N-(C2H4OH)(C2H5)amino]thiazole | violet |
| 42 | 2-NH2, 3-NO2, 5-NO2, 6-CO2CH3 benzene | 4-(benzofuran-3-yl)-2-[N-(C2H4CN)(C2H5)amino]thiazole | blue |

-continued
| Example | Diazo component | Coupling component | Hue on polyester |
|---|---|---|---|
| 43 | 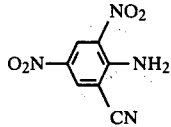 | 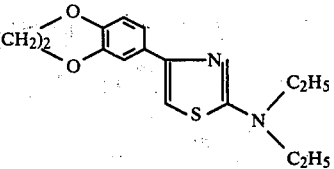 | green |
| 44 | 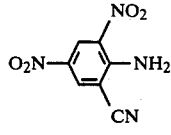 | 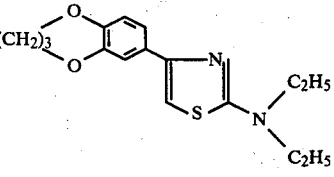 | green |
| 45 | 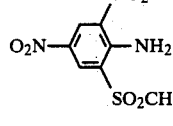 | 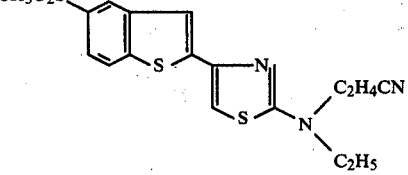 | green |
| 46 | 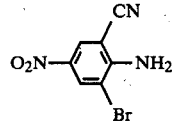 | 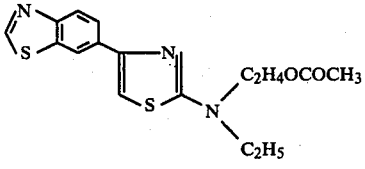 | blue |
| 47 | 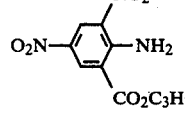 | 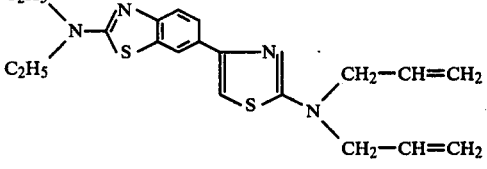 | blue |
| 54 | 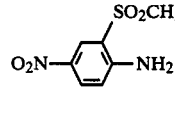 | 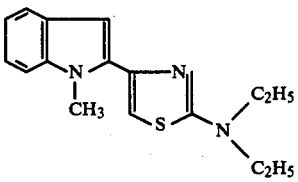 | violet |
| 55 | 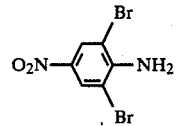 | 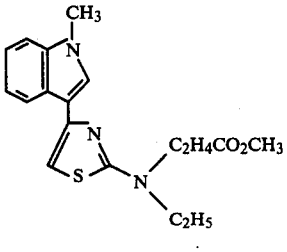 | violet |
| 56 | 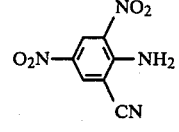 | 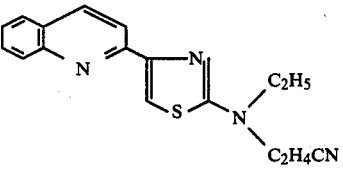 | green |
We claim:
1. A monoazo dye of the thiazole series, having the general formula I.

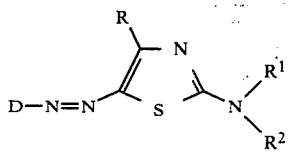

where
D is the radical of an aromatic diazo component,
R is a heterocyclic radical and
$R^1$ and $R^2$ are hydrogen or unsubstituted or substituted hydrocarbon radicals, which may also together form a ring, which may or may not be heterocyclic.

2. A compound as claimed in claim 1, where R is a radical of the furan, thiophene, dioxane, benzofuran, dibenzofuran, indole, quinoline, thiazole, benzthiazole, dibenzothiophene, thienothiophene or pyridine series.

3. A monoazo dye as claimed in claim 1, of the general formula I a

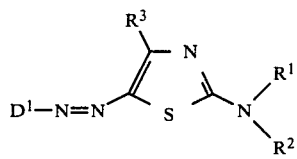

where
$D^1$ is unsubstituted or substituted phenyl and
$R^3$ is a radical of the formula

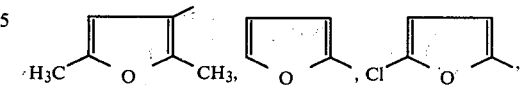

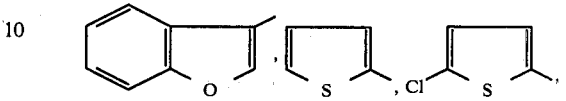

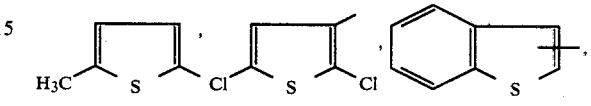

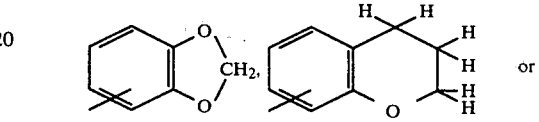

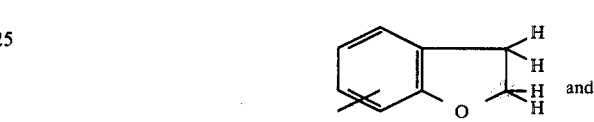

$R^1$ and $R^2$ have the stated meanings.

* * * * *